(12) United States Patent
Chambliss et al.

(10) Patent No.: US 9,053,141 B2
(45) Date of Patent: Jun. 9, 2015

(54) SERIALIZATION OF ACCESS TO DATA IN MULTI-MAINFRAME COMPUTING ENVIRONMENTS

(75) Inventors: David D. Chambliss, Morgan Hill, CA (US); Joshua W. Knight, Mohegan Lake, NY (US); Ronald K. Kreuzenstein, Sunnyvale, CA (US); John J. Lee, Scotts Valley, CA (US); Nicholas C. Matsakis, Poughkeepsie, NY (US); James A. Ruddy, San Jose, CA (US); John G. Thompson, Tucson, AZ (US); Harry M. Yudenfriend, Pouighkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/285,768

(22) Filed: Oct. 31, 2011

(65) Prior Publication Data
US 2013/0111026 A1    May 2, 2013

(51) Int. Cl.
*G06F 15/16* (2006.01)
*G06F 15/173* (2006.01)
*G06F 17/30* (2006.01)

(52) U.S. Cl.
CPC .............................. *G06F 17/30362* (2013.01)

(58) Field of Classification Search
CPC ........................ G06F 17/30; G06F 17/30091
USPC ........................................ 709/225, 224, 246
See application file for complete search history.

(56) References Cited

U.S. PATENT DOCUMENTS

| | | | |
|---|---|---|---|
| 4,847,754 A | 7/1989 | Obermarck et al. | |
| 5,319,782 A | 6/1994 | Goldberg et al. | |
| 5,850,426 A | 12/1998 | Watkins et al. | |
| 5,926,833 A | 7/1999 | Rasoulian et al. | |
| 6,173,360 B1 | 1/2001 | Beardsley et al. | |
| 7,065,765 B2 | 6/2006 | Cadden et al. | |
| 7,219,198 B2 | 5/2007 | Sivaram et al. | |
| 7,836,228 B1 | 11/2010 | Moir et al. | |
| 7,839,875 B1 * | 11/2010 | Masputra et al. | 370/412 |

(Continued)

FOREIGN PATENT DOCUMENTS

WO   2010089222 A1   8/2010
WO   2012158890 A1   11/2012

OTHER PUBLICATIONS

Hasu, Tero, 2002. "Implementing Jini Servers without Object Serialization Support" Retrieved on Aug. 29, 2013 from <terohasu.net/jini.pdf>.*

(Continued)

*Primary Examiner* — Brian J Gillis
*Assistant Examiner* — Juan C Turriate Gastulo
(74) *Attorney, Agent, or Firm* — Cantor Colburn LLP; William A. Kinnaman, Jr.

(57) ABSTRACT

A multi-mainframe operating system serialization method can include receiving, in a first computing system, a request to access a data set on behalf of a first peer application, sending, in the first computing system, a notification to a second peer application to obtain a normal enqueue, in response to the second peer application obtaining the normal enqueue, obtaining, in the first computing system, a first rider enqueue for the data set and sending, in the first computing system, a communication to peer instances to obtain additional rider enqueues for the data set, the additional rider enqueues corresponding to the first rider enqueue.

9 Claims, 3 Drawing Sheets

(56) References Cited

U.S. PATENT DOCUMENTS

| | | | |
|---|---|---|---|
| 8,131,860 B1* | 3/2012 | Wong et al. | 709/228 |
| 8,161,330 B1 | 4/2012 | Vannatter et al. | |
| 8,170,968 B2 | 5/2012 | Colclough et al. | |
| 2001/0010053 A1* | 7/2001 | Ben-Shachar et al. | 709/105 |
| 2003/0208706 A1 | 11/2003 | Roddy et al. | |
| 2004/0139142 A1 | 7/2004 | Arwe | |
| 2004/0260852 A1* | 12/2004 | Olstad et al. | 710/200 |
| 2006/0047828 A1* | 3/2006 | Dearing et al. | 709/229 |
| 2006/0059228 A1* | 3/2006 | Kasamsetty et al. | 709/203 |
| 2007/0150595 A1* | 6/2007 | Bhorania et al. | 709/226 |
| 2007/0162449 A1* | 7/2007 | Manolov et al. | 707/8 |
| 2008/0189352 A1* | 8/2008 | Mitchell et al. | 709/201 |
| 2008/0215767 A1 | 9/2008 | Nagami et al. | |
| 2008/0313416 A1* | 12/2008 | Frondozo et al. | 711/162 |
| 2009/0217103 A1 | 8/2009 | Borelli et al. | |
| 2009/0222599 A1 | 9/2009 | Lehr et al. | |
| 2010/0023521 A1 | 1/2010 | Arcese et al. | |
| 2010/0228789 A1 | 9/2010 | Macedo | |
| 2010/0275203 A1 | 10/2010 | Shinohara et al. | |
| 2010/0287554 A1 | 11/2010 | Amundsen et al. | |
| 2010/0306394 A1 | 12/2010 | Brown et al. | |
| 2010/0313208 A1 | 12/2010 | Zarzycki et al. | |
| 2010/0332776 A1* | 12/2010 | Uchikado et al. | 711/162 |
| 2011/0061093 A1 | 3/2011 | Korkus et al. | |
| 2011/0099166 A1* | 4/2011 | Mugundan et al. | 707/736 |
| 2011/0208798 A1 | 8/2011 | Murrell et al. | |
| 2011/0225373 A1* | 9/2011 | Ito et al. | 711/145 |
| 2011/0252173 A1 | 10/2011 | Armstrong et al. | |
| 2012/0005763 A1 | 1/2012 | Stefik et al. | |
| 2012/0030070 A1* | 2/2012 | Keller et al. | 705/28 |
| 2012/0096078 A1* | 4/2012 | Coates et al. | 709/203 |
| 2012/0151063 A1* | 6/2012 | Yang et al. | 709/226 |
| 2012/0174191 A1 | 7/2012 | Wood | |
| 2013/0054803 A1* | 2/2013 | Shepard et al. | 709/225 |
| 2013/0085985 A1* | 4/2013 | Maxfield | 707/609 |

OTHER PUBLICATIONS

Gaitonde et al., "Model and Architecture for Diagnostic Requests in a Heterogeneous Distributed Environment", IP.com IPCOM000122033D, Apr. 4, 2005, pp. 1-7.

Disclosed Anonymously, "Avoidance of working storage stack data diagnostic information invalidation when handling an error condition or gathering First Failure Data Capture information", IP.com IPCOM00019489D, Apr. 12, 2010, pp. 1-4.

IBM; "ITCAM Agent for WebSphere Application: Configuring and using TTAPI"; IBM Tivoli Composite Application Manager for Application Diagnostics, Version 7.1.0.1; 2009-2010; 46 pgs.

Combined Search and Examination Report under Sections 17 and 18(3) for GB Application No. GB1216252.5 mailed Jan. 8, 2013, 5 pgs.

International Search Report and Written Opinion for International Application No. PCT/IB2012/055499 mailed Jan. 29, 2013, 6 pgs.

Abstract of Japanese Publication No. JP2000322306A, Publication Date: Nov. 24, 2000; Applicant: Fujitsu Ltd, 1 pg.

Abstract of Japanese Publication No. JP2000311063A, Publication Date: Nov. 7, 2000 Applicant: Hitachi Ltd, 1 pg.

* cited by examiner

SERIALIZATION OF ACCESS TO DATA IN MULTI-MAINFRAME COMPUTING ENVIRONMENTS

BACKGROUND

The present invention relates to multi-mainframe computing systems, and more specifically, to systems and methods for serialization of access to data resources in multi-mainframe or heterogeneous computing environments.

In a typical multi-mainframe computing environment, a mainframe can include multiple servers. For example, in a System z hybrid environment, an IBM® System z mainframe (e.g. zEnterprise® 196) is coupled to IBM® blades housed in one or more IBM® BladeCenter® instances. The coupling is accomplished by Ethernet networks via Transmission Control Protocol/Internet Protocol (TCP/IP). If any data needs to be transferred from the mainframe to a server, the data passes over the Ethernet network. Applications involving high volume and high speed data transfers, such as database accesses (e.g., via Direct Access Storage Devices (DASD)) within the multi-mainframe computing environment can include considerable processing that may impact other work in a mainframe.

With a suitable channel implementation on the server coordinating the data transfers, it is possible for the server and mainframe to share access to the same database storage devices (e.g., DASD). As such, the server can directly access the data and load the data without requiring much mainframe processing or transfer over the Ethernet network.

In multi-mainframe operating systems that manage concurrently hosted units of work, serialization (e.g., Global Resource Serialization (GRS)) is a mechanism that ensures that multiple conflicting accesses to a data set are serialized so that the integrity of the data is preserved. For example, if multiple users were allowed to update the same data set at the same time, data corruption could occur. Serialization allows users that update a data set to obtain exclusive access to the data set while they are updating it. However, sometimes there are servers that are not part of the multi-mainframe operating system, but still do access a common database shared between the multi-mainframe operating system servers and the external computers. In such a case, the serialization service chosen to be used by the resource owner on the multi-mainframe operating system may not be available to the external servers. In this situation there is no way to serialize accesses to data set resources among programs running on the multi-mainframe operating systems and programs running simultaneously on the external server operating systems.

SUMMARY

Exemplary embodiments include a multi-computing system serialization method, including receiving, in a first computing system, a request to access a data set on behalf of a first peer application, sending, in the first computing system, a notification to a second peer application to obtain a normal enqueue, in response to the second peer application obtaining the normal enqueue, obtaining, in the first computing system, a first rider enqueue for the data set and sending, in the first computing system, a communication to peer instances to obtain additional rider enqueues for the data set, the additional rider enqueues corresponding to the first rider enqueue.

Additional exemplary embodiments include a computer program product including a non-transitory computer readable medium storing instructions for causing a computer to implement a multi-mainframe operating system serialization method. The method can include receiving, in a first computing system, a request to access a data set on behalf of a first peer application, sending, in the first computing system, a notification to a second peer application to obtain a normal enqueue, in response to the second peer application obtaining the normal enqueue, obtaining, in the first computing system, a first rider enqueue for the data set and sending, in the first computing system, a communication to peer instances to obtain additional rider enqueues for the data set, the additional rider enqueues corresponding to the first rider enqueue.

Further exemplary embodiments include a multi-mainframe system, including a first server mainframe, a second server mainframe, wherein the first and second mainframes are part of a logical system, a server communicatively coupled to the first and second server mainframes, a data set accessible by the first and second mainframes and the server and a process residing on at least one of the first and second server mainframes, the process configured to access the data set with serialization on behalf the server.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
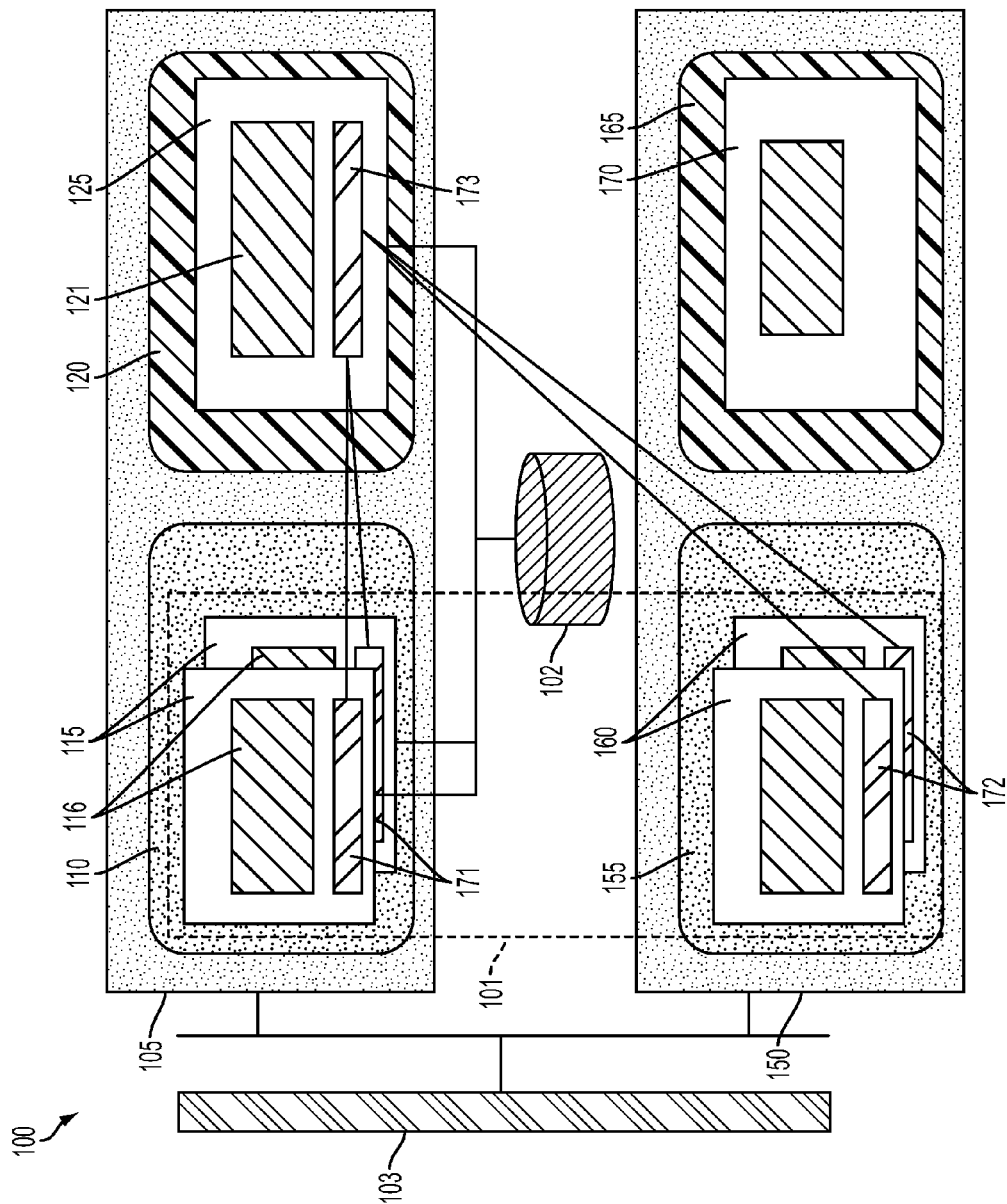
FIG. 1 illustrates an exemplary system for serialization of access to data resources.

In exemplary embodiments, the systems and methods described herein serialize access to data among systems that support data serialization and systems that do not support serialization in a multi-mainframe environment. FIG. 1 illustrates an exemplary system 100 for serialization of access to data resources. The system 100 includes a first multi-mainframe configuration 105 and a second multi-mainframe configuration 150. In exemplary embodiments, the multi-mainframe configurations 105, 150 manage one or more mainframes or other computing systems that each support differing operating systems via a management interface 103. For example, the first multi-mainframe configuration 105 can include a first server mainframe 110 having one or more server modules 115. In the examples described herein, the server modules run an operating system that can support multiple workloads (e.g., z/OS). The first multi-mainframe configuration 105 can further include an additional server 120 having a computing system 125 that runs an operating system (e.g., Linux) differing from the operating system running on the server modules 115 in the first server mainframe 110. The second multi-mainframe configuration 150 can include a second server mainframe 155 having one or more server modules 160. In the examples described herein, the server modules run an operating system that can support multiple workloads (e.g., z/OS). The second multi-mainframe configuration 150 can further include an additional server 165 having a computing system 170 that runs an operating system (e.g., Linux) differing from the operating system running on the server modules 115 in the first server mainframe 110 and the operating system running on the server module 160 in the second server mainframe 155.

In exemplary embodiments, the first and second mainframes 110, 155 may be a part of a single logical system (e.g., a Parallel Sysplex® configuration) 101 in which the first and second mainframes 110, 155 act together as a single system combining data sharing and parallel computing, for example. As such, the server modules 115, 160 can operate as a single unit within their respective server mainframes 110, 155. The operating systems running on the server modules 115, 160 (e.g., z/OS®) can support various components such as serialization that enables fair access to serially reusable computing resources, such as datasets and tape drives or virtual resources, such as lists, queues, and control blocks. Programs residing on the server modules 115, 160 can request exclusive access to a resource (which means that program and all subsequent requesting programs are blocked until that program is given access to the resource), usually requested when a program needs to update the resource or shared access (which means that multiple programs can be given access to the resource), usually requested when a program only needs to query the state of the resource. Serialization manages all requests in FIFO (first in/first out) order. As such, the system 100 further includes a data set 102 that is accessible by the server modules 115, 160. It can be appreciated that the data set 102 can reside in any suitable storage device. The respective operating systems on the server modules 115, 160 implement serialization to coordinate multiple accesses to the data set 102, preventing conflicts and preserving data integrity. However, the additional servers 120, 165 run an operating system (e.g., Linux®) that does not support the required serialization. In exemplary embodiments, as described further herein the system includes additional components to provide serialization for the operating systems on the servers 120, 165 that do not support serialization.

In exemplary embodiments, the system 100 is a hybrid of operating systems on the server modules 115, 160 that support serialization allowing non-conflicting controlled access to the data set 102, and the servers 120, 165 that do not support serialization, which can cause conflicts and loss of data integrity in the data set 102. For example, the system 100 serializes access to the data set 102 among a program 116 running on the server module 115 and programs 121 running simultaneously on the server 120. For illustrative purposes the single program 116 on the server module 115 and the single program 121 on the server 120 are discussed. It can be appreciated that other programs on the other server modules and servers described herein are contemplated. As such, before the data 102 set is accessed by an application program running on the server 120, the corresponding application program, running on one of the server modules 115, obtains a serialization component (e.g., enqueues in z/OS®) on behalf of the program 121 running on the server 120. For illustrative purposes and ease of discussion, the serialization components are referred to as enqueues herein.

The program 121 running on one of the servers 120 runs under the protection of the enqueues obtained by the server module 115. In addition, another enqueue called a rider enqueue allows new requesters to also become owners of an outstanding enqueue within the logical system 101. The enqueue is not released until the original owner and all rider enqueue owners have released their interest (dequeued) in the serialization component. As the rider enqueues immediately become owners of the targeted owned enqueue, they are not blocked by any waiting enqueues that were issued after the original normal enqueue. In exemplary embodiments, rider enqueues are obtained by programs running on each of the server mainframes 110, 155 in the logical system 101 in order to provide continued protection for the program 121 running on the server 120 in the event that the original server module 115, which first obtained enqueues on behalf of the program 121 running on the server 120, goes down and loses the serialization that it obtained.

In exemplary embodiments, the system 100 can further include an application layer that facilitates the operation of the program 116 running on the server module 115 and its corresponding program 121 running on the server 120. In exemplary embodiments, there is an instance 171, 172 of the application layer running on each of the server modules 115, 160 in the logical system 101 and an instance 173 running on the sever 120. It can be appreciated that other instances can be running on other components on the system 100 such as the server 165 as well.

The instances 171, 172, 173 of the application layer function in conjunction with the rider enqueue as further described herein. In exemplary embodiments, the rider enqueue targets the enqueue to be "ridden" by providing the same enqueue identity (major name, minor name, and scope) as the corresponding normal enqueue. An attempt to obtain a rider enqueue fails if the corresponding normal enqueue is not currently held. Rider enqueues function to ride an outstanding normal enqueue. If the enqueue is not held, the rider enqueue does not ride the enqueue. In addition, during an attempt to obtain a normal enqueue, existing contention rules are followed and currently held rider enqueues have the same effect as currently held normal enqueues. Therefore, an attempt to obtain a normal enqueue succeeds unless one of the following conditions exist: 1) The normal enqueue being obtained is a shared enqueue and there are outstanding exclusive rider enqueue and/or normal enqueues; 2) The normal enqueue being obtained is an exclusive enqueue and there are outstanding rider enqueues and/or normal enqueues of any type (shared or exclusive). In addition, during an attempt to obtain a rider enqueue, the following contention rules are followed: 1) If the rider enqueue being obtained is a shared enqueue, the attempt succeeds unless there are outstanding exclusive rider enqueues and/or normal enqueues; and 2) If the rider enqueue being obtained is an exclusive enqueue, the attempt succeeds unless there are outstanding shared rider enqueues and/or normal enqueues. An attempt to obtain an exclusive rider enqueue succeeds if there are outstanding exclusive rider enqueues and/or normal enqueues and any number of exclusive rider enqueue can be held concurrently. In addition, a dequeue by the original normal enqueue owner does not remove any rider enqueue owners. All owners including rider enqueues must dequeue before the resource (i.e., the data set 102) is no longer owned or held.

In FIG. 1, the programs 116 in the first server mainframe 110 and the program 121 running on the server 120 can be considered hybridized or hybrid portions of a single program. The programs 116 run in the server modules 115 that have operating systems that are coupled to other operating systems (e.g., the operating systems running on the server modules 160) in the logical system 101 (e.g., a Parallel Sysplex® configuration), which includes the serialization components (e.g., GRS). The server mainframes 110, 155 in the logical system 101 and the server 120 all share the data set 102 that includes the multi-mainframe operating system (e.g., z/OS®) data that is also to be accessed by the portion of the hybrid program, the program 121, which does not support serialization as described herein.

Figure 2:
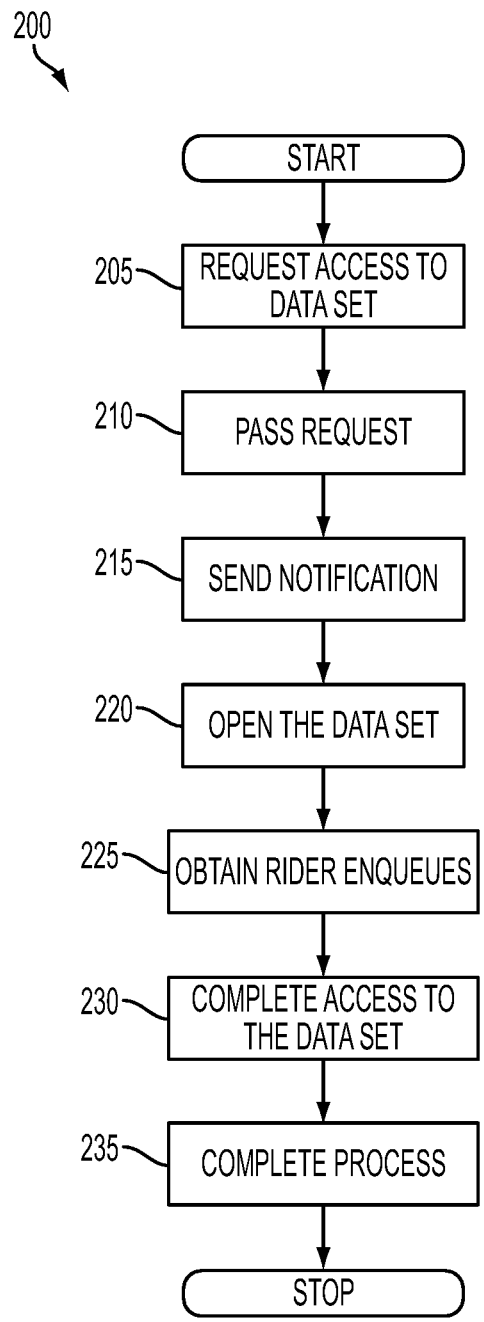
FIG. 2 illustrates a flow chart of a method 200 for serialization of access to a data set in accordance with exemplary embodiments.

FIG. 2 illustrates a flow chart of a method 200 for serialization of access to the data set 102 in the system 100 in accordance with exemplary embodiments. In exemplary embodiments, when the program 121 is ready to access the multi-mainframe operating system data set 102, the program 121 calls the application layer instance 173 running on the respective operating system (e.g., Linux) at block 205. At block 210, the instance 173 passes the request to the application layer instance 171 running on the server modules 115, where the other portion of the hybrid program, the program 116, is running. The instance 171 notifies the program 116 that the program 121 (i.e., the counterpart of the program 116) on the server 120 is ready to access the data set 102 at block 215.

In exemplary embodiments, at block 220, the program 116 opens the data set 102, which includes obtaining normal enqueues to properly protect the process running on the server 120 as the server 120 accesses the data set 102. For example, if the program 121 is going to update the data set 102, the serialization can include an exclusive enqueue with a major name of "SYSDSN," a minor name equal to the data set name, and a scope of "SYSTEMS".

When the program 116 returns to the instance 171, at block 225, the instance 171 obtains rider enqueues to the normal enqueues obtained during open processing and then communicates with peer instances (e.g., the instance 172) of the instance 171 running on the other operating systems in the logical system 101 to have them obtain the same rider enqueues for the data set 102. As part of this communication, the calling instance 171 passes all of the information needed for the other instances of the instance 171 to obtain the proper rider enqueues. This information includes at least the name and type of the data set 102 being accessed and the type of access being used. As such, in the present example, all the instances of the instance 171 would each raise a rider enqueue with a major name of "SYSDSN," a minor name equal to the data set name, and a scope of "SYSTEMS."

As part of this same communication, the calling instance 171 also passes the information to the other instances of the instance 171 (e.g., instance 172) that they need to communicate with the instance 173 running on the server 120 to determine whether or not the program 121 is still running on the server 120. This information may include the TCP/IP address and port of the instance 173 and an identifier of the program 121 running on the server 120.

Once all of the instances of the instance 171 have obtained their rider enqueues, the instance 171 running on the server 115 with the program 116 can return to the instance 173 and the instance 173 can return to the program 121, which can begin accessing the data set 102. When the program 121 finishes accessing the data set 102, a similar process takes place to release the serialization: The program 121 invokes the instance 173, which in turn invokes the instance 171 running on the server module 115, which is running the program 116. At block 230, the instance 171 releases its rider enqueues and calls all of the other instances of the instance 171 and they release the rider enqueues that they previously obtained. The instance 171 then calls the program 116 and the program 116 releases its normal enqueues for the data set 102 as well. Control then returns back to the program 121 for further clean up and/or process completion at block 235.

The purpose of the rider enqueues by peers of the instance 171 on server mainframes and server modules in the logical system 101 is to protect the program 121 as it accesses the data set 102 in the event that the server module 115 where the corresponding instance of the program 121 is running crashes, causing the serialization held by the server module 115 on behalf of the program 121 to be lost. The purpose of the instance 171 rider enqueues on the operating system where the hybrid application (e.g., the program 116) serialized the data set 102, is to protect the program 121 in the event that the program 116 fails in such a way that Close termination processing releases the corresponding enqueues previously obtained by the program 116 before the instance 171 has a chance to terminate the program 121. If such an event were to occur and the rider enqueues were not held, other programs running on the other mainframe server operating systems could gain access to the data set while it is still being accessed by the program 121, which introduces a number of exposures. One such exposure would be if an unrelated program running on one of the surviving mainframe operating systems were to open the data set 102 for update access. Without the rider enqueues, the enqueues raised by the unrelated program would succeed and the program could begin updating the same data that the program 121 is updating, resulting in a corruption of the data in the data set 102.

To continue with the aforementioned example, the enqueue raised by the unrelated program would include a normal exclusive enqueue with a major name of "SYSDSN," a minor name equal to the data set name, and a scope of SYSTEMS. This enqueue would succeed and allow the unrelated program to update the data set if the rider enqueues were not held. With the rider enqueues in place, the enqueue attempted by the unrelated program will fail or be blocked preventing the unrelated program from accessing the data set until the data set is truly available for its use.

If the mainframe operating system where the program 116 is running crashes while the program 121 is still running, the instances of the instance 171 running on the other operating systems (e.g., the instance 172) recognize the failure. The other instances of the instance 171 then communicate with the instance 173 until it has also recognized the failure and terminated the program 121 process on the server 120. At that point, the other instances of the instance 171 know that it is safe to release their rider enqueues to allow other programs to access the data set 102.

Figure 3:
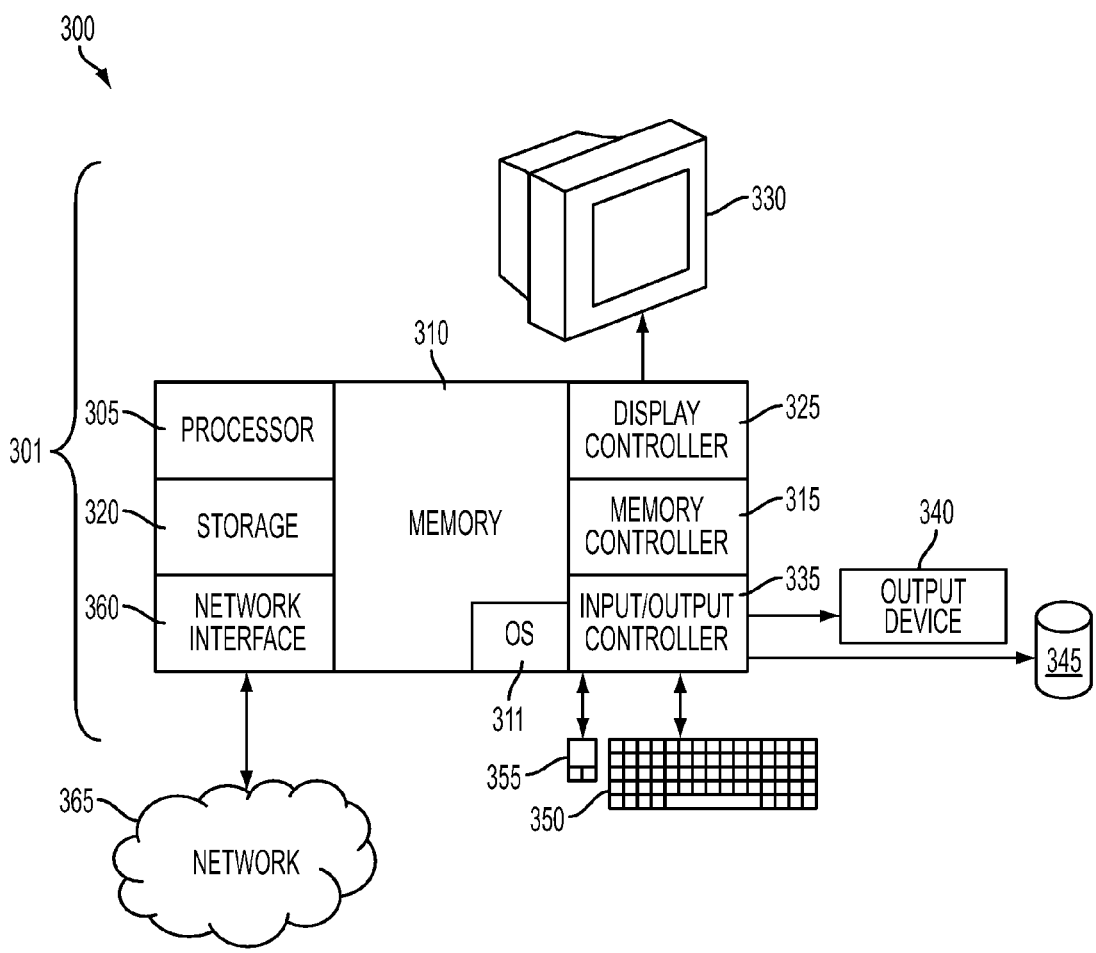
FIG. 3 illustrates an exemplary embodiment of a system that can be implemented to serialize access to data among systems that support data serialization and systems that do not support serialization in a multi-mainframe environment.

The server modules 115, 160 and servers 120, 165 can be any suitable computing system as now described. FIG. 3 illustrates an exemplary embodiment of a system 300 that can be implemented to serialize access to data among systems that support data serialization and systems that do not support serialization in a multi mainframe environment. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 300 therefore includes general-purpose computer 301.

In exemplary embodiments, in terms of hardware architecture, as shown in FIG. 3, the computer 301 includes a processor 305, memory 310 coupled to a memory controller 315, and one or more input and/or output (I/O) devices 340, 345 (or peripherals) that are communicatively coupled via a local input/output controller 335. The input/output controller 335 can be, but is not limited to, one or more buses or other wired or wireless connections, as is known in the art. The input/ output controller 335 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 305 is a hardware device for executing software, particularly that stored in memory 310. The processor 305 can be any custom made or commercially available processor, a central processing unit (CPU), an auxiliary processor among several processors associated with the computer 301, a semiconductor based microprocessor (in the form of a microchip or chip set), a macroprocessor, or generally any device for executing software instructions.

The memory 310 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, and/or other types of storage media. Note that the memory 310 can have a distributed architecture, where various components are situated remote from one another, but can be accessed by the processor 305.

The software in memory 310 may include one or more separate programs, each of which comprises an ordered listing of executable instructions for implementing logical functions. In the example of FIG. 3, the software in the memory 310 includes the serialization methods described herein in accordance with exemplary embodiments and a suitable operating system (OS) 311. The OS 311 essentially controls the execution of other computer programs, such the serialization systems and methods as described herein, and provides scheduling, input-output control, file and data management, memory management, and communication control and related services.

The serialization methods described herein may be in the form of a source program, executable program (object code), script, or any other entity comprising a set of instructions to be performed. When a source program, then the program needs to be translated via a compiler, assembler, interpreter, or the like, which may or may not be included within the memory 310, so as to operate properly in connection with the OS 311. Furthermore, the serialization methods can be written as an object oriented programming language, which has classes of data and methods, or a procedure programming language, which has routines, subroutines, and/or functions.

In exemplary embodiments, a conventional keyboard 350 and mouse 355 can be coupled to the input/output controller 335. Other output devices such as the I/O devices 340, 345 may include input devices, for example but not limited to a printer, a scanner, microphone, and the like. Finally, the I/O devices 340, 345 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 300 can further include a display controller 325 coupled to a display 330. In exemplary embodiments, the system 300 can further include a network interface 360 for coupling to a network 365. The network 365 can be an IP-based network for communication between the computer 301 and any external server, client and the like via a broadband connection. The network 365 transmits and receives data between the computer 301 and external systems. In exemplary embodiments, network 365 can be a managed IP network administered by a service provider. The network 365 may be implemented in a wireless fashion, e.g., using wireless protocols and technologies, such as WiFi, WiMax, etc. The network 365 can also be a packet-switched network such as a local area network, wide area network, metropolitan area network, Internet network, or other similar type of network environment. The network 365 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 301 is a PC, workstation, intelligent device or the like, the software in the memory 310 may further include a basic input output system (BIOS) (omitted for simplicity). The BIOS is a set of essential software routines that initialize and test hardware at startup, start the OS 311, and support the transfer of data among the hardware devices. The BIOS is stored in ROM so that the BIOS can be executed when the computer 301 is activated.

When the computer 301 is in operation, the processor 305 is configured to execute software stored within the memory 310, to communicate data to and from the memory 310, and to generally control operations of the computer 301 pursuant to the software. The serialization methods described herein and the OS 311, in whole or in part, but typically the latter, are read by the processor 305, perhaps buffered within the processor 305, and then executed.

When the systems and methods described herein are implemented in software, as is shown in FIG. 3, the methods can be stored on any computer readable medium, such as storage 320, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the serialization methods are implemented in hardware, the serialization methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include serializing access to data sets in systems that support serialization from systems that do not support serialization.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A multi-computing system serialization method, comprising:
   receiving, by a first computing system of the multi-computing system, a request to access a data set on behalf of a first peer application, wherein the first computing system does not support serialized access to the data set;
   sending, by the first computing system, a notification to a second peer application on a second computing system of the multi-computing system to obtain a normal enqueue, wherein the second computing system of the multi-computing system supports serialized access to the data set;
   in response to the second peer application obtaining the normal enqueue, obtaining, in the first computing system, a first rider enqueue for the data set; and
   sending, in the first computing system, a communication to peer instances to obtain additional rider enqueues for the data set, the additional rider enqueues corresponding to the first rider enqueue;
   in response to the first peer application completing access to the data set, releasing the rider enqueue and sending a notification to the second peer application to release the normal enqueue, wherein the first computing system is given serialized access to the data set via the second computing system in the multi-computing operation system.

2. The method as claimed in claim 1 further comprising releasing the rider enqueue in response to the first peer application completing access to the data set.

3. The method as claimed in claim 2 further comprising sending a notification to release the additional rider enqueues.

4. The method as claimed in claim 1 wherein the normal enqueue serializes access to the data set on behalf of the first peer application.

5. A computer program product including a non-transitory computer readable medium storing instructions for causing a computer to implement a multi-computing system serialization method, the method comprising:
   receiving, by a first computing system of the multi-computing system, a request to access a data set on behalf of a first peer application, wherein the first computing system of the multi-computing system does not support serialized access to the data set;
   sending, by the first computing system, a notification to a second peer application on a second computing system of the multi-computing system to obtain a normal enqueue, wherein the second computing system of the multi-computing system supports serialized access to the data set;
   in response to the second peer application obtaining the normal enqueue, obtaining, in the first computing system, a first rider enqueue for the data set; and
   sending, in the first computing system, a communication to peer instances to obtain additional rider enqueues for the data set, the additional rider enqueues corresponding to the first rider enqueue;
   in response to the first peer application completing access to the data set, releasing the rider enqueue and sending a notification to the second peer application to release the normal enqueue,
   wherein the first computing system is given serialized access to the data set via the second computing system in the multi-computing operation system.

6. The computer program product as claimed in claim 5 wherein the method further comprises holding the rider enqueue during a time period in which the first peer application accesses the data set.

7. The computer program product as claimed in claim 5 wherein the method further comprises sending a notification to release the additional rider enqueues.

8. The computer program product as claimed in claim 5 wherein the normal enqueue serializes access to the data set on behalf of the first peer application.

9. A multi-mainframe system, comprising:
   a first server mainframe;
   a second server mainframe, wherein the first and second mainframes are part of a logical system;
   a server communicatively coupled to the first and second server mainframes;
   a data set accessible by the first and second mainframes and the server, wherein the first and second mainframes support serialized access to the data set and wherein the server does not support serialized access to the data set; and
   a process residing on at least one of the first and second server mainframes, the process configured to access the data set with serialization on behalf of the server, the process including:
   sending, by a first peer application on the first server mainframe, a notification to a second peer application on the second server mainframe to obtain a normal enqueue;
   in response to the second peer application obtaining the normal enqueue, obtaining, in the first server mainframe, a first rider enqueue for the data set; and
   sending, by the first server mainframe, a communication to peer instances to obtain additional rider enqueues for the data set, the additional rider enqueues corresponding to the first rider enqueue;
   in response to the first peer application completing access to the data set, releasing the rider enqueue and sending a notification to the second peer application to release the normal enqueue,
   wherein the server is given serialized access to the data set via one of the first and second mainframes.

* * * * *